Patented Aug. 7, 1934

1,969,382

UNITED STATES PATENT OFFICE 1,969,382

PREPARATION OF A STABLE HYDROALCOHOLIC EXTRACT OF ERGOT

Ferdinand W. Nitardy, Brooklyn, N. Y., assignor to E. R. Squibb & Sons, New York, N. Y., a corporation of New York No Drawing. Application May 21, 1932, Serial No. 612,866

6 Claims. (Cl. 87—28)

This invention relates to hydro-alcoholic extracts of ergot.

As hitherto prepared, hydro-alcoholic extracts, notably the fluid-extract, of ergot have been characterized by serious instability and consequent rapid diminution of potency on aging. Thus, samples of the fluidextract made in accordance with the directions of the United States Pharmacopoeia, tenth revision, have been found to possess at the end of one year less than half their original activity.

It is the object of this invention to provide stable hydro-alcoholic extracts of ergot and an advantageous method for the preparation thereof.

In the practice of this invention, stable hydro-alcoholic extracts of ergot are prepared by extracting ergot at room temperature with a hydro-alcoholic menstruum acidified to such a degree as to yield an extract having a pH of about between 2.5 and 3 (whereas prior-art processes were characterized by operation at elevated temperatures and/or with menstruums having lower hydrion concentrations). Among the menstruums that may be employed are those of which more than three percent, preferably about 4 percent, by volume is hydrochloric acid U. S. P. X and the remainder is diluted alcohol U. S. P. X. Diluents for reducing the strength of the extract should also have a pH of about between 2.5 and 3.

For example, stable fluidextract of ergot may be prepared by subjecting ergot to repercolation (which is an extraction process performed at room temperature) with a menstruum composed of diluted alcohol U. S. P. X and hydrochloric acid U. S. P. X in the respective approximate proportions by volume of twenty-four and one. More specifically, ergot recently ground and coarsely powdered is defatted by slow percolation with purified petroleum benzine and is removed from the percolator and dried by exposure to air. One kilogram of the drug is divided into three portions of 500 g., 300 g., and 200 g., respectively. A menstruum composed of 40 cc. of hydrochloric acid U. S. P. X and 960 cc. of diluted alcohol U. S. P. X is provided, and the first portion (500 g.) of the drug is moistened with a sufficient quantity of the menstruum to render it evenly and distinctly damp and to maintain it so during maceration for six hours in a tightly-covered container. It is then packed in a cylindrical percolator, and enough of the menstruum is added to saturate, and leave a stratum above, the powder. When the liquid begins to drop from the percolator, the lower orifice is closed, and, the percolator having been closely covered, the drug is macerated for forty-eight hours; and then percolation is allowed to proceed slowly, more of the menstruum being gradually added. The first 200 cc. of percolate is reserved, and the process is continued until the additional percolate, collected in successive portions of 300 cc. each, measures 1500 cc. The second portion of the drug (300 g.) is moistened with a sufficient quantity of the percolate collected in the preceding operation immediately after the reserved portion, to render it evenly and distinctly damp and to maintain it so during maceration for six hours in a tightly-covered container. It is then packed in a cylindrical percolator, macerated, and percolated as before, the several portions of percolate from the preceding operation being used as menstruum in the order in which they were collected and, if insufficient, being followed with more of the original menstruum. The first 300 cc. of percolate is reserved, and the process is continued until the additional percolate, collected in successive portions of 200 cc. each, measures 800 cc. The third portion of the drug (200 g.) is moistened with a sufficient quantity of the percolate collected in the preceding operation immediately after the reserved portion, to render it evenly and distinctly damp and to maintain it so during maceration for six hours in a tightly-covered container. It is then packed in a cylindrical percolator, macerated, and percolated as before, the several portions of percolate from the preceding operation being used as menstruum in the order in which they were collected and, if insufficient, being followed with more of the original menstruum. 420 cc. of the percolate is collected and is mixed with the two portions previously reserved. After a portion of it has been assayed, the mixture, which is the concentrated fluidextract, may be adjusted to the desired alkaloidal or physiological strength by addition of aqueous alcoholic hydrochloric acid having a pH of about between 2.5 and 3.

Fluidextract of ergot so prepared is conspicuously stable, samples thereof, for instance, having shown no loss in strength after storage for a year.

It is to be understood that the foregoing example is merely illustrative and by no means limitative of the invention, which may be variously otherwise embodied—especially as to the particular acids and menstruums used and the procedures followed—within the scope of the appended claims.

I claim:

1. The method of preparing hydro-alcoholic extracts of ergot that comprises extracting ergot at room temperature with a hydro-alcoholic menstruum acidified to such a degree as to yield an extract having a pH of about between 2.5 and 3.

2. The method of preparing fluidextract of ergot that comprises extracting ergot at room temperature with a hydro-alcoholic menstruum acidified to such a degree as to yield an extract having a pH of about between 2.5 and 3.

3. The method of preparing fluidextract of ergot that comprises extracting ergot at room temperature with a menstruum composed of diluted alcohol U. S. P. X and hydrochloric acid U. S. P. X in the respective approximate proportions by volume of twenty-four and one.

4. The method of preparing fluidextract of ergot that comprises subjecting ergot to repercolation with a menstruum composed of diluted alcohol U. S. P. X and hydrochloric acid U. S. P. X in the respective approximate proportions by volume of twenty-four and one.

5. The method of preparing fluidextract of ergot that comprises extracting ergot at room temperature with a menstruum composed of diluted alcohol U. S. P. X and hydrochloric acid U. S. P. X in the respective approximate proportions by volume of twenty-four and one, and adding aqueous alcoholic hydrochloric acid having a pH of about between 2.5 and 3 for adjustment to the desired reduced alkaloidal or physiological strength.

6. The method of preparing fluidextract of ergot that comprises subjecting ergot to repercolation with a menstruum composed of diluted alcohol U. S. P. X and hydrochloric acid U. S. P. X in the respective approximate proportions by volume of twenty-four and one, and adding aqueous alcoholic hydrochloric acid having a pH of about between 2.5 and 3 for adjustment to the desired reduced alkaloidal or physiological strength.

FERDINAND W. NITARDY.